United States Patent [19]

Ohtusuki et al.

[11] 4,308,084

[45] Dec. 29, 1981

[54] PROCESS FOR PREPARING RETORT-PROOF METAL LAYER LAMINATES FOR PACKAGING FOODSTUFFS USING ALUMINUM HYDROXIDE-MODIFIED COPOLYMERS AS ADHESIVES

[75] Inventors: Akira Ohtusuki, Higashikurume; Taro Oyama, Houya; Atsuhiro Yamamoto, Kawagoe; Ryosuke Suganuma, Kawaguchi, all of Japan

[73] Assignee: Morton-Norwich Products, Inc., Chicago, Ill.

[21] Appl. No.: 188,055

[22] Filed: Sep. 17, 1980

Related U.S. Application Data

[63] Continuation-in-part of Ser. No. 24,668, Mar. 28, 1979, abandoned.

[51] Int. Cl.$^3$ .................. B32B 7/14; B32B 15/08; B32B 15/20; B65D 85/70
[52] U.S. Cl. .................. 156/233; 156/244.12; 156/244.22; 156/244.24; 156/244.27; 156/320; 156/334; 206/524.1; 426/113; 426/114; 426/126; 427/208.2; 427/355; 427/359; 427/375; 428/35; 428/344; 428/349; 428/356; 428/461; 428/469; 428/470; 428/516
[58] Field of Search .................. 426/113, 114, 126; 156/233, 244.12, 244.22, 244.24, 244.27, 320, 334; 427/208.2, 355, 359, 375; 428/344, 349, 356, 461, 469, 470, 516

[56] References Cited

U.S. PATENT DOCUMENTS

4,092,452  5/1978  Hori et al. .................. 428/516

FOREIGN PATENT DOCUMENTS

48-37494  5/1973  Japan .
49-27580  8/1974  Japan .
52-19238  3/1977  Japan .

*Primary Examiner*—James G. Cannon
*Attorney, Agent, or Firm*—Jack Axelrood

[57] ABSTRACT

A process for preparing a retort-proof laminate for packaging foodstuffs which comprises laminating an aluminum substrate to at least one polyolefin film selected from the group consisting of high density-polyethylene, polypropylene, ethylene-propylene copolymers and polybutene films using as an adhesive a specific polyolefin resin in melted state prepared by combining together (A) at least one member selected from the group consisting of high-density polyethylene, polypropylene ethylene-propylene copolymers and polybutene, (B) maleic anhydride and (C) aluminum hydroxide, and by rendering said specific polyolefin resin substantially free from unreacted maleic anhydride and low molecular weight maleic anhydide homopolymers.

The process also includes preparing a retort-proof coated aluminum substrate for packaging foodstuffs which comprises coating an aluminum substrate with a layer formed from the above-described specific polyolefin resin and thereafter forming a suitable retort packaging container therefrom.

7 Claims, 7 Drawing Figures

PROCESS FOR PREPARING RETORT-PROOF METAL LAYER LAMINATES FOR PACKAGING FOODSTUFFS USING ALUMINUM HYDROXIDE-MODIFIED COPOLYMERS AS ADHESIVES

CROSS REFERENCE TO PRIOR APPLICATION

This is a Continuation-In-Part of Application Ser. No. 024,668 filed Mar. 28, 1979, now abandoned.

BACKGROUND OF THE INVENTION

1. Field Of The Invention

With the advent of pre-cooked foodstuffs, foodstuff packaging laminates have been in remarkably increased demand, and various ones are being used. In particular, there is an increased demand for foodstuff packaging laminates which enable foodstuffs packed therein to be sterilized at high temperatures, such sterilization being referred to as "retort" and such packed and sterilized foodstuffs being called "retort foodstuffs" for convenience sake.

It is generally required that foodstuff packaging laminates have the following basic properties: (1) they must not be toxic and must be hygienically satisfactory since they contact foodstuffs directly; (2) they must be satisfactorily impermeable to gases or the like to permit foodstuffs packed therein to keep their flavor and taste unchanged for a long time (such impermeability being hereinafter sometimes referred to as a "barrier property"); (3) they must have satisfactory light-intercepting properties to prevent foodstuffs packed therein from degradation and denaturalization due to ultraviolet light radiation or the like; (4) they must have high mechanical strength and satisfactory impact strength, (5) they must be highly resistant to water and chemicals such as acids and alkalies and (6) they must have good heat sealability so that they can be thermally bonded under pressure in a very short time. In addition, (7) they are required to have good heat resistance and (8) not to lose bond strength when foodstuffs packed therein are subjected to sterilization in a retort. For example, the laminates must not suffer a diminution in any of the above properties when contacted with water, acids, alkalies, oils or the like at high temperatures, when they are subjected to retort conditions, i.e., high-temperature sterilization at usually 100°-140° C. for as long as one hour.

2. Description Of the Prior Art

A single packaging film alone will not meet such stringent requirements. Thus, composite films, i.e., laminates, are used as foodstuff packaging materials. The components of the composite materials for packaging foodstuffs include polyolefin, polyamide, polyester and aluminum and, in many cases, combinations of an aluminum substrate such as foil or sheet having particularly excellent barrier properties with a hygienically-acceptable polyolefin film are used as retort-proof packing or packaging materials for foodstuffs. Aluminum foils are generally used for lamination with polyester films or the like. Among polyolefin films, high density-polyethylene, polypropylene, ethylene-propylene copolymers and polybutene are preferred as retort-proof packing materials for foodstuffs because of their heat resistance.

It is generally known that high density-polyethylene, polypropylene, ethylene-propylene copolymers, polybutene and other polyolefins are useful as foodstuffs packaging materials because of their excellent sanitary properties. However, these materials exhibit poor adherence to other materials because of their high crystallinity and non-polarity. To eliminate thee drawbacks, the above polyolefins are subjected to various chemical and physical treatments, or to ultraviolet irradiation, electronic beams or the like. More particularly, chemical treatment of the polyolefins with sulphuric acid-chromate is certainly effective if conducted at elevated temperatures; however, this treatment is not efficiently conducted since it is of the wet type and corrodes the reaction apparatus. Therefore, this treatment is now used only for basic studies in attempts to improve the adhesiveness of polyolefins. Polyolefins copolymerized with $\alpha,\beta$-ethylenically unsaturated carboxylic acids, such as acrylic acid, methacrylic acid and maleic anhydride, as well as esters thereof, are used to attempt to improve adhesion for bonding polyolefin to other materials. In this case, however, either only a very low bond strength is obtained or heat and pressure are required for an excessive length of time to attain satisfactory bond strength. In addition, primers are used in many cases to accelerate adhesion. Corona discharge-treated polyolefin films are widely used for industrial purposes but, in this case, the improvement in bond strength is limited and an adhesive is additionally used. There are few industrial processes for modifying or reforming polyolefin itself to make it highly adhesive. In fact, polyurethane resins and the like are widely used as adhesives in cases where a highly secure bond is necessary between polyolefin films and other materials.

However, polyurethane resins are said to have the following disadvantages: (1) it is probable that the unreacted diisocyanate and polyol, as well as monomers and low molecular weight polymers remain in the polyurethane resins. These substances migrate to the packaged foodstuffs thereby raising food contamination problems; (2) It usually takes about one week at ambient temperaure or at least one day at 50°-60° C. to obtain, by aging, a practically useful bond between metallic and/or plastic (resinous) food packaging films; (3) Foaming is encountered, thereby producing nonuniform bond strength throughout the bonded portion and seriously affecting the acceptability of the resulting product. Although the polyurethane resins have the aforesaid disadvantages, they are still in use since no other materials useful as an adhesive for polyolefin and aluminum are now available.

Thus, there is a need for producing polyolefin-aluminum food packaging laminates having excellent, virtually instantaneous bond strengths, and resistance to deterioration or delamination under retort conditions without imparting deleterious substances to the packaged food.

It is also known that polyolefin resins incorporating a metal compound are used in lamination in the field of building or construction materials and packing materials. In addition, the metal ion-crosslinked polyolefin resins are considered as a kind of thermoplastic resin (ionomer) wherein the long-chain molecules are connected to each other by means of ion linkage. Structurally, the ion linkages between the long-chain molecules are produced with aid of the monovalent or polyvalent metal cations and the carboxyl groups of long-chain molecules.

The compositions and uses of conventional polyolefin resins are disclosed in literature as indicated below.

In U.S. Pat. No. 3,264,274, R. W. Rees discloses ionic copolymers obtained by reacting a copolymer of an α-olefin and an ethylenically unsaturated monocarboxylic acid with a monovalent to trivalent metal ion and also discloses ion-crosslinked copolymers obtained by reacting a copolymer of an α-olefin and an ethylenically unsaturated dicarboxylic acid with a monovalent metal ion. In addition, he teaches that the ion-crosslinked copolymers are useful as adhesives and they may be laminated on paper, metal foils and plastics. However, he also states that it is inappropriate to react the copolymer of α-olefin and α,β-ethylenically unsaturated dicarboxylic acid with the polyvalent metal ion.

In Japanese Patent Gazette, Patent No. 19238/77, K. Shirayama et al. teach that a resin composition is useful as an adhesive in forming laminates of polyolefin with a metal, the resin composition being prepared by reacting a crystalline polyolefin with an usaturated aliphatic carboxylic acid and/or anhydride thereof as well as with the oxide and/or sulphate of a metal of Groups IIa, IIIa and IVb of the Periodic Table at a temperature higher than the melting point of the polyolefin.

In the Japanese Patent "Laying-Open" Gazette, Ser. No. 37494/73, K. Shirayama et al. disclose a polyolefin composition prepared by reacting polyolefin with an unsaturated aliphatic carboxylic acid and/or anhydride thereof as well as with the hydroxide or alcoholate of a metal of Groups Ia, IIa, IIIa and IVb of the Periodic Table at a temperature higher than the melting point of the polyolefin, and they also disclose that the polyolefin composition so prepared exhibits particularly excellent adhesion to polyolefin moldings, aluminum, iron, copper, zinc and the like and teach that the composition may be used as an adhesive in laminating a synthetic resin with a metal.

In Japanese Patent Gazette, Patent No. 17971/72, I. Aijima et al. disclose a process for a feasible thermoplastic monoolefin polymer by reacting a thermoplastic monoolefin polymer with (a) a radically polymerizable carboxylic acid, (b) a radical initiator and (c) the oxide, hydroxide or carbonate or lithium, potassium, sodium, magnesium, calcium, zinc, aluminum or silicon, at an elevated temperature in the presence or absence of a solvent or medium. The feasible thermoplastic monoolefin polymer so obtained may be used in the production of injection molded articles, vacuum molded articles and the like without a decrease in impact strength and creep characteristics.

In Japanese Patent "Laying-Open" Gazette, Ser. No. 27580/74, I. Iwami et al. disclose laminates in which a metal-containing copolymer is interposed between the metal and the ethylenic-copolymer, the ethylenic copolymer being a copolymer of the ethylene, an α,β-ethylenically unsaturated carboxylic acid, an α,β-ethylenically unsaturated carboxylic acid metal salt and, if desired, an α,β-ethylenically unsaturated carboxylic acid ester. The laminates so disclosed are used in communication cables.

In Japanese Patent "Laying-Open" Gazette, Ser. No. 74583/73, T. Fujimoto et al. teach packing materials which are sterilizable at a high temperature under pressure and have as the inner layer a film prepared from a composition consisting of high-density polyethylene and ionomer. The Gazette also teaches that an ionomer sold under the trademark Surlyn (produced by E. I. Du Pont De Nemours & Co.) may be used as a retort-proof packing material for foodstuffs. However, the ionomer-incorporated film is laminated by means of dry lamination using a urethane type adhesive.

In any event, it is not known that polyolefin resins prepared by combining together a heat-resistant polyolefin, maleic anhydride and aluminum hydroxide, are very useful in the production of retort-proof packing materials for foodstuffs, having excellent, virtually instantaneous bond strength and being capable of production at a high rate of speed.

It is necessary that foodstuff packaging laminates be manufactured at a high production speed (that is, they must be bonded together virtually instantaneously and they must have high bond or adhesive strength before and after being heated at retort conditons). They must not decrease in bond strength during prolonged storage in contact with various foods after having been retorted. Further, they must not produce any appreciable extracts or materials which migrate into the food.

Therefore, the primary object of this invention is to provide a process for preparing retort-proof, polyolefin-aluminum foodstuff packaging laminates which can be produced at a high production rate with virtually instantaneous bond strengths and with excellent bond strengths even under retort conditions, and which laminates permit the storage of foodstuffs therein without significant loss of bond strength.

SUMMARY OF THE INVENTION

This object is achieved by the provision of a process which prepares a retort-proof material, particularly a laminate, for packaging foodstuffs. More particularly, this invention relates to a process for preparing a retort-proof packaging laminate of an aluminum substrate and a film of polyolefin such as high density-polyethylene, polypropylene, an ethylene-propylene copolymer or polybutene, using a polyolefin resin (hereinafter sometimes referred to as "specific polyolefin resin") as an adhesive in a softened or melted state thereby enabling the laminate to be produced at a high lamination speed and to retain excellent bond strength even after being heated in a retort. The specific polyolefin resin is produced by combining together maleic anhydride, aluminum hydroxide and a polyolefin selected from the group consisting of high density-polyethylene, polypropylene, ethylene-propylene copolymers and polybutene, and by rendering said specific polyolefin resin substantially free from unreacted maleic anhydride and low molecular weight maleic anhydride homopolymer.

This invention relates to a process for preparing a retort-proof laminate for packaging foodstuffs which comprises laminating an aluminum foil or sheet with at least one polyolefin film selected from the group consisting of high-density polyethylene, polypropylene, ethylene-propylene copolymers and polybutene films using as an adhesive a specific polyolefin resin in melted state prepared by combining together (A) at least one member selected from the group consisting of high-density polyethylene, polypropylene, ethylene-propylene copolymers and polybutene, (B) maleic anhydride and (C) aluminum hydroxide, and by rendering said specific polyolefin resin substantially free from unreacted maleic anhydride and low molecular weight maleic anhydride homopolymer.

This invention also relates to a process for preparing a retort-proof coated aluminum substrate for packaging foodstuffs, which process comprises coating an aluminum substrate with a specific polyolefin resin formed by combining (A) at least one member selected from the group consisting of high density-polyethylene, polypropylene, ethylene-propylene copolymers and polybutene, (B) maleic anhydride and (C) aluminum hydroxide, and by rendering said specific polyolefin resin substantially free from unreacted maleic anhydride and low molecular weight maleic anhydride homopolymer and thereafter forming a suitable retort packaging container therefrom.

It has also been found that polyolefin resins prepared from heat-resistant polyolefin, maleic anhydride and aluminum hydroxide in combination are very effective in the production of retort-proof, foodstuff packaging laminates. It should be noted that the high-speed lamination and post-retort high bond strength (i.e., high bond strength achieved after heating under retort conditions) are not obtained: by the use of polyolefin resins which are other than the specific ones in this invention, or by combining polyolefin with maleic anhydride; or by combining together polyolefin, aluminum hydroxide and an $\alpha,\beta$-ethylenically unsaturated carboxylic acid other than maleic anhydride; or by combining together polyolefin, maleic anhydride and a metal compound other than aluminum hydroxide; or by failing to render the specific polyolefin resin substantially free from unreacted maleic anhydride and low molecular weight maleic anhydride homopolymer.

The polyolefin (A) which may be used in the invention is a heat-resistant polyolefin and includes high density-polyethylene produced by low pressure polymerization, an ethylene-propylene copolymer produced by low pressure polymerization, high density-polyethylene produced by medium pressure polymerization, an ethylene-propylene copolymer produced by medium pressure polymerization, a high crystalline polymer such as isotactic or syndiotactic polypropylene, or a low crystalline polymer such as atactic polypropylene. Polybutene of any crystallinity may also be used irrespective of the fact that it varies in crystallinity from low to high depending on its tacticity. Ethylene-propylene copolymers may further be used, whether they are random ones or block ones; however, propylene-rich copolymers are preferred since the ethylene-propylene copolymers are required to be heat resistant. Each or both of these olefins (ethylene and propylene) may be polymerized with a third copolymerizable component to produce a copolymer or terpolymer which may also be used and preferably selected depending on the purpose for which it is used.

The $\alpha,\beta$-ethylenically unsaturated carboxylic acid used in the present invention is maleic anhydride (B). As compared with other $\alpha,\beta$-ethylenically unsaturated carboxylic acids, maleic anhydride may be easily graft copolymerized with the polyolefin (A).

Maleic anhydride (B) is used in amounts of 0.01–30 parts by weight per 100 parts by weight of the polyolefin (A). The use of maleic anhydride in an amount of less than 0.01 part by weight, in conjunction with (A) and (C), will result in the production of a polyolefin resin (specific polyolefin resin) which when used as a retort-proof adhesive in a laminate for packaging an edible oil, acetic acid or the like therein, will not result in excellent post-retort bond strength. On the other hand, the use of maleic anhydride in an amount of more than 30 parts by weight will not produce any further improvement in bond strength.

The metal compound (C) used in the present invention is aluminum hydroxide. The compound (C) is used in an amount of 0.05–10 parts by weight per 100 parts by weight of the heat-resistant polyolefin (A), thus resulting in the production of a specific polyolefin resin which will exhibit high bond strength when subjected to heating for as little as 0.3 and up to 5 seconds and will not decrease significantly in bond strength during storage of foodstuffs after retorting. The use of less than 0.05% by weight of the metal compound (C) will make it difficult for the resulting specific polyolefin resin to have high bond strength when heat treated for a short time as indicated above, while the use of more than 10 parts by weight of the compound (C) will not exhibit increased bond strength, even when heat treated.

If metal compounds other than aluminum hydroxide, such as aluminum oxide, aluminum sulphate, aluminum acetate, sodium hydroxide, calcium hydroxide, iron hydroxides and zinc hydroxide, are used in the production of a polyolefin resin then the thus produced polyolefin resin after heat treating will not exhibit satisfactory post-retort bond strength even if it exhibits satisfactory pre-retort (this term being intended to mean "before heating in a retort") bond strength.

Some of the metal compounds, other than aluminum hydroxide, which have been reacted with the compounds (A) and (B) to produce a polyolefin resin, impart a satisfactory post-retort bond strength to the thus produced polyolefin resin, if the resin is heat treated for a long time; however, it will not if the resin is heat treated for a short time. This is very disadvantageous from the view-point of operational speed. In other words, the operational speed will have to be decreased in the instance of a metal compound other than aluminum hydroxide if the same bond strength is to be obtained as where aluminum hydroxide is used. Further, a long time heat treatment may cause degradation of the polyolefin resin.

The specific polyolefin resin used in the present invention may be prepared by several methods as illustrated below.

(1) A method comprising adding the compound (C) to a heated mixture of the compounds (A) and (B);

(2) A method comprising adding the compound (B) to a heated mixture of the compounds (A) and (C);

(3) A method comprising adding a heated mixture of the compounds (B) and (C) to the compound (A) in heated state; and (4) A method comprising mixing the compounds (A), (B) and (C) together and heating the resulting mixture.

The order in which the compounds (A), (B) and (C) are added and mixed is not limited to the above, and in addition to these, adding and mixing reactions in which other energy sources are used may be employed.

By using any one of the aforesaid methods, the specific polyolefin resins according to the present invention may be easily obtained. Further, the aforesaid four methods may be carried out using sufficient heat to melt the compounds or using a solvent to dissolve the compounds therein.

For example, the method (1) using sufficient heat to melt the compounds, comprises melt mixing the heat-resistant polyolefin (A) with maleic anhydride (B) at a temperature 10°–100° C. higher than the softening point of the polyolefin (A) by the use of heating rolls or an extruder and then incorporating the resulting melted mixture with aluminum hydroxide (C) to obtain a specific polyolefin resin. In this method, the melt mixing may usually be effected for 5–90 minutes, and the aluminum hydroxide (C) may preferably be fine (less than about 1 $\mu$, for example) in particle size for addition as is. However, if the compound (C) has a larger particle size, then it should be mixed with the other compounds by a suitable means to obtain a uniform mixture.

On the other hand, the aforesaid methods using a solvent are advantageous in cases where the unreacted materials are removed and the discloration of the product resin to be obtained should be avoided. The solvents used herein generally include aromatic hydrocarbons such as toluene, xylene and that available under the trademark Solvesso (produced by Esso Company). For example, the polyolefin (A) and maleic anhydride (B) in respective predetermined amounts are incorporated with xylene and then graft copolymerized in the presence of benzoyl peroxide (BPO).

In a case where the compounds (A) and (B) are to be mixed together, maleic anhydride (B) may be wholly added at once to the compound (A) or may be added dropwise thereto. The latter is advantageous in that by-products will be produced in lesser amounts and the specific polyolefin resin to be finally obtained will have more satisfactory bonding strength. The mixing under heat may be effected at 130°–135° C. for 30 minutes to 3 hours. It is desirable that the graft copolymer of the compounds (A) and (B) be washed thoroughly.

The graft copolymer of (A) and (B) is then mixed with aluminum hydroxide (C) and heated for 15–60 minutes. It is desirable in this case that the aluminum hydroxide (C) be dispersed in a small amount of methanol, acetone, water or the like to form a dispersion which is then mixed uniformly with a solution of the graft copolymer.

As demonstrated hereinafter in Example 1, the excellent bond strength of the specific polyolefin resin of the present invention is achieved by rendering it substantially free from unreacted maleic anhydride and low molecular weight maleic anhydride homopolymer. A convenient method of achieving this is by washing with a suitable solvent such as, for example, methyl ethyl ketone, acetone, ethyl acetate, or the like, during or after the synthesis of the specific polyolefin resin.

As previously stated, 100 parts by weight of the polyolefin (A), 0.01–30 parts by weight of maleic anhydride (B) and 0.05–10 parts by weight of aluminum hydroxide (C) were combined together to obtain the specific polyolefin resin on which about 0.01–1% by weight of maleic anhydride (B) is graft copolymerized; it is desirable that the unreacted maleic anhydride and low molecular weight maleic anhydride homopolymers be removed thoroughly since they are not permissible for a food contact use and their presence adversely affects the bond strength of the product resin. In addition, aluminum hydroxide (C) may be partly or wholly dispersed in, or reacted (crosslinked or coordinate bonded) with the graft copolymer.

The specific polyolefin resins so produced may be used in the following various manners. They may be dissolved or dispersed in xylene, Solvesso (produced by Esso Company), kerosene or other organic solvents, water alone, or a mixed solvent prior to their use; they may be extruded onto a substrate by the use of an extruder to coat the substrate therewith; they may be formed into films which are then bonded to a substrate or inserted between two substrates; they may be coated on a substrate to form a coating which is then laminated with another substrate, or they may be formed into films which are bonded to another film and then laminated to another substrate; they may be coated in powder form.

The specific polyolefin resins are used as an adhesive layer or in the form of a plastic film.

The retort-proof, foodstuff packaging laminates of the present invention consist essentially of (1) an aluminum foil or sheet, (2) a high-density polyethylene film, polypropylene film, ethylene-propylene copolymer film or polybutene film and (3) the specific polyolefin resin according to the present invention as an adhesive in a coating or sheet form. The laminates are illustrated by aluminum foil (outer layer)/specific polyolefin resin/polypropylene (inner layer); aluminum foil (outer layer)/specific polyolefin resin/high-density polyethylene film (inner layer); polyamide film (outer layer)/aluminum foil/specific polyolefin resin/polypropylene film (inner layer); polyamide film (outer layer)/aluminum foil/specific polyolefin resin/high-density polyethylene film (inner layer); polyester film (outer layer)/aluminum foil/specific polyolefin resin/polypropylene film (inner layer), polyester film (outer layer)/aluminum foil/specific polyolefin resin/high-density polyethylene (inner layer); polyester film (outer layer)/aluminum foil/specific polyolefin resin/ethylene-propylene copolymer film (inner layer); polyester film (outer layer)/aluminum foil/specific polyolefin resin/polybutene film (inner layer); and polyester film (outer layer)/aluminum foil/specific polyolefin resin/polypropylene suspension coating (inner layer). Aluminum foil/specific polyolefin resin coating; polyester/aluminum foil/specific polyolefin resin coating; and polyamide/aluminum foil/specific polyolefin resin coating.

Foodstuff packaging laminates using therein the specific polyolefin resin film according to the present invention include retort-proof soft packaging laminates comprising at least one plastic film and an aluminum foil and retort-proof rigid packaging laminates comprising an aluminum sheet or the like.

In addition, it is desirable for the packaging laminates, from the view point of adhesiveness, that polypropylene films, ethylene-propylene copolymer films and polybutene films be used as the component films of the laminate in a case where the specific polyolefin resin is made from polypropylene, while high density-polyethylene films may be used as the component films in a case where the specific polyolefin resin is made from high density-polyethylene.

The component materials used in the present invention may be laminated together in the following various manners. As an example of lamination, an aluminum substrate, foil or sheet is coated with the specific polyolefin resin in melted state and then laminated on the polyolefin resin layer with a heat-resistant polyolefin film. In this lamination of the heat-resistant polyolefin film, it is not always necessary to melt the specific polyolefin resin. As another example of lamination, the specific polyolefin resin is laminated with a heat-resistant polyolefin film and then melt laminated on the melted resin side with an aluminum foil or sheet. As a further example, the specific polyolefin resin is interposed between a heat-resistant polyolefin film and an aluminum substrate, after which the three are laminated together.

Packaging laminates having high bond strength are not obtained only by coating or superimposing the specific polyolefin resin on an aluminum substrate. In any lamination method, therefore, a composite of an aluminum substrate coated with the specific polyolefin resin, or a composite of an aluminum substrate, a heat-resistant polyolefin film and the specific polyolefin resin interposed therebetween is subjected to heat treatment to melt the specific resin and thereby to increase the bond strength of the resulting laminate. The term "composite" as used herein is intended to mean component materials such as an aluminum substrate coated with the specific polyolefin resin, or an aluminum substrate, plastic film, and a specific polyolefin resin merely superimposed one upon another but not yet subjected to heat treatment to effect a securely bonded or laminated structure. The heat treatment may be effected by contact with heating rolls or heating plates, by the radiation of infra-red light or by the use of a heating furnace. In a case where such a composite is obtained by the use of an extruder or the like, it is effective from the view-point of operation and heat efficiency to heat treat the composite immediately upon formation.

Heat treatment with heating rolls or plates is an effective method since it makes possible a high-speed operation and also since such heating rolls or plates may be easily incorporated in an industrial manufacturing system. Further, heating by contact with heating rolls or plates is excellent in heat efficiency whereby the heat can be kept fairly constant and adverse effects caused by variation of temperature may be eliminated. The contact with the heating rolls or plates is to make the specific polyolefin resin melt adhere to the other component material. The composite may be contacted with the heating device at the specific polyolefin resin side or at the side of the other component material, preferably at the aluminum substrate side. In a method for contacting the heating device with the specific polyolefin resin, since this resin is softened or melted, care must be taken that the specific polyolefin resin is not transferred to the heating rolls or plates. In the practice of the present invention, it is not always necessary to melt the specific polyolefin resin thoroughly, although the term "melt" is used in the description of lamination herein. The specific resin may be softened short of actual melting in some instances. The heating rolls or plates are preferably of the rotation type or movable type, however, they may also be fixed. They may be cylindrical, semi-cylindrical, flat or of curved surface in shape. They are not limited in shape and are only so shaped so that they make contact with the component materials (including the specific polyolefin resin) to effect the necessary heating. The preferable heating rolls are rotatable and cylindrical ones. The heating rolls may be rotated by a driving source, by frictional contact with the component materials or by a trackless belt system.

The heating rolls or plates may be heated by any heating source which heats the heating rolls or plates so that the surface thereof is kept at a fixed suitable temperature. The surface temperature of the heating rolls or plates may vary depending mainly on the particular specific polyolefin resin, line velocity and contact time. The surface temperature may be about 150° to 220° C. for the specific polyolefin resin in which the polyolefin unit is derived from high-density polyethylene or polybutene and it may be about 180° to 250° C. for the resin in which the polyolefin unit is derived from polypropylene or ethylene-propylene copolymers.

The heating rolls or plates may be made of any satisfactorily heat-resistant material, preferably a metal, and they may also be made of a metal/heat-resistant polymer structure. In cases where the specific polyolefin resin or other component materials are likely to be partly transferred to the heating rolls or plates, it is preferable that the surface of the rolls or plates be Teflon-treated.

BRIEF DESCRIPTION OF THE DRAWINGS

The methods by which the heating rolls or plates contact with the component materials of laminates to be prepared, will be explained hereinbelow by reference to the accompanying drawings in which.

Figure 1:
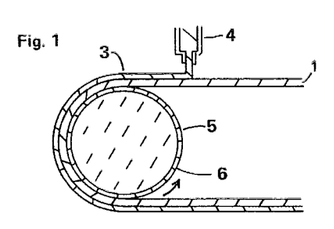
FIGS. 1-4 are each a cross-sectional view showing an embodiment of the present invention.
Figure 2:
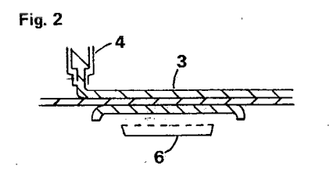
Figure 3:
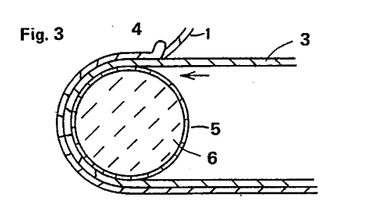
Figure 4:
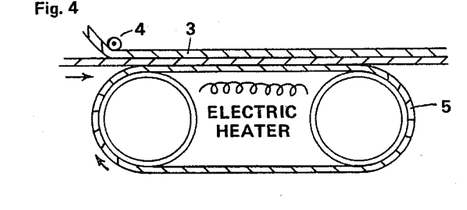

FIGS. 1 and 4 show a method using a heating roll, FIG. 2 a method using a heating plate, and FIG. 3 a method using a belt type heating plate. In the drawings, numeral 1 indicates an aluminum foil or sheet. An aluminum foil or sheet already laminated with a polyester resin or the like may also be used, although it is not shown in the accompanying drawing. The drawings depict a heat-resistant polyolefin film at 2, a specific polyolefin resin at 3, a device to hold and feed the specific polyolefin resin at 4, a heating roll or plate at 5, a heating source at 6, a rubber roll at 7, an infra red light source at 8 and a heating furnace at 9. The heating source 6 is shown in FIG. 1, a heating medium in the roll in FIGS. 3, 5 and 6, and an electric heater in FIGS. 4 and 7.

Figure 6:
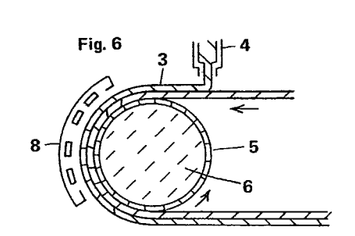
FIG. 6 is a cross-sectional view showing melt adhesion and infra-red light radiation.
Figure 7:
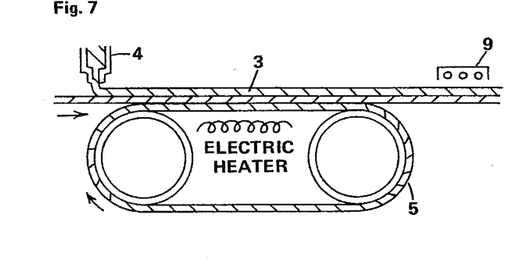
FIG. 7 is a cross-sectional view showing heating by an electric heater.

Rapid heating may be effected by the use of the heating roll or plate 5 because of heat conduction. This is an efficient heating method. If necessary, the heating roll or plate 5 capable of rapid heating, the infra-red light radiation device 8 and a heating furnace 9 may be used in combination. The combined use of the heating roll or plate 5, the infra-red light radiation device 8 and/or the heating furnace 9 is effective in forming a specific polyolefin resin coating in a large thickness. FIG. 6 shows a method using the heating roll 5 and the infra-red light radiation device 8 in combination for melting and adhesion. FIG. 7 shows a method using the heating furnace 9 immediately after the use of the heating roll 5 for melting and adhesion. FIG. 6 shows an effective method for forming a specific polyolefin resin in a large thickness, while it is more difficult to obtain secure adhesion by the use of conventional methods.

The heat treatment has been explained mainly referring to the heating roll or plate in the drawings, however, it may be effected by the use of the infra-red light radiation alone or the heating furnace alone.

DESCRIPTION OF THE PREFERRED EMBODIMENTS

The present invention will be better understood by the following Examples wherein parts and percentages are by weight unless otherwise specified.

EXAMPLE 1

One hundred (100) parts of polypropylene having a melt index (M.I.) of 10, 20 parts of maleic anhydride and 375 parts of xylene were added to a 1-liter three-necked flask provided with a nitrogen inlet, thermometer and agitator. The resulting mixture was heated to 130° C. with agitation in a nitrogen gas atmosphere and then incorporated dropwise with a solution of 0.1 part of benzoyl peroxide in 40 parts of xylene over a time period of 90 minutes, after which the whole was heated to 130° C. and maintained at this temperature with agitation for 60 minutes. The reaction mixture so obtained was cooled to room temperature to obtain a suspension. The suspension so obtained was filtered to remove the xylene therefrom, washed repeatedly, 5 successive times, with quantities of methyl ethyl ketone which were each about 30 times the volume of the suspension (polypropylene-maleic anhydride) until the unreacted maleic anhydride and low molecular weight maleic anhydride homopolymers were hardly detected by liquid chromatography in the methyl ethyl ketone washings, thereby obtaining a polypropylene-maleic anhydride copolymer resin containing about 0.6% by weight of the maleic anhydride moiety, which was then air dried. The copolymer resin so air dried was incorporated with 6.5 parts of aluminum hydroxide to form a mixture which was melted at 180° C. in an extruder and extruded to obtain a specific polyolefin resin in pellet form. The specific polyolefin resin pellets so obtained were extruded by an extruder (dies temperature, 240° C.; resin temperature, 210° C.) onto the aluminum foil surface of a 15μ thick aluminum foil/polyester film laminate to form thereon a 10μ thick coating of the specific polyolefin resin. After the whole was heat treated at 180° C. for 5 seconds, a 70μ thick corona discharge-treated polypropylene film was laminated onto the specific polyolefin resin layer and the resulting laminate was then passed on a heating roll heated to 180° C. at a velocity of 40 m/min, thereby obtaining a packaging laminate.

The bond strength (adhesion strength) between the polypropylene and aluminum foil of the packaging laminate so obtained was at least 1230 g/15 mm without interlayer separation although the polypropylene film itself was elongated when a 90° peeling test was effected at a pull velocity of 100 mm/min. Containers or pouches were made of the thus obtained packaging laminate. Water, a salad oil/water (1:1) mixture, and a 3% aqueous solution of acetic acid were enclosed separately in the thus-made containers, each container was then subjected to retorting at 120° C. for 30 minutes. Thereafter, the post-retort bond strengths were determined with the results being shown in the following Table 1.

TABLE 1

| Contents | Water | Salad oil/water | 3% aq. solution of acetic acid |
|---|---|---|---|
| Post-retort bond strength (g/15 mm) | 1220 | 1140 | 1020 |

Thereafter, a 4% aqueous solution of acetic acid and a seasoning of Chinese food were each packed in separate containers or pouches made of the aforesaid packaging laminate and then subjected to a preservation test by storage at 66° C. (151° F). The aforesaid seasoning contained soy, soybean oil, bean paste, rice wine, garlic, ginger and the like. The container for the acetic acid solution was tested for its bond or adhesion strength one week after the start of the test and the container for the seasoning was tested for its bond or adhesion strength two weeks thereafter. The results are shown in the following Table 2.

TABLE 2

| PRESERVATION TEST | | |
|---|---|---|
| Contents | 4% acetic acid Solution | Seasoning for Chinese food |
| Bond strength (g/15 mm) Temperature | 970 One week storage 66° C. | 1100 Two weeks storage 66° C. |

The preparation of the specific polyolefin resin of this example was repeated three more times. The first time the suspension of polypropylene-maleic anhydride copolymer resin was washed only once with methyl ethyl ketone; the second time the suspension of polypropylenemaleic anhydride copolymer resin was washed three times; and the third time, it was washed five times.

The bond strength between the polypropylene film and aluminum foil of the packaging laminate obtained using each one-time, three-times, and five-times washed polypropylene-maleic anhydride resin, was determined with the results being shown in the following Table 2A.

TABLE 2A

| | 1-time washed (bond Strength g/15 mm) | 3-times washed (bond strength g/15 mm) | 5-times washed (same as example 1) (bond strength g/15 mm) |
|---|---|---|---|
| Pre-retort | 150 | 1110 | 1230 |
| Post-retort Contents | | | |
| Water | delamination | 1080 | 1220 |
| Salad oil/water(1/1) | " | 1000 | 1140 |
| 3% aqueous solution of acetic acid | " | 980 | 1020 |
| Preservation test (at 66° C.) Contents | | | |
| 4% acetic acid solution (one week storage) | " | 350 | 970 |
| Seasoning for Chinese food (two weeks storage) | " | 450 | 1100 |

This demonstrates the increased bond strength due to the removal of unreacted maleic anhydride and low molecular weight maleic anhydride homopolymer.

EXAMPLE 2

Samples of the packaging laminate obtained in Example 1 were subjected to a retort test at 140° C. for 20 minutes and thereafter the post-retort bond strengths were determined with the results being shown in the following Table 3.

TABLE 3

| Contents | Water | Salad oil/water | 3% aqueous solution of acetic acid |
|---|---|---|---|
| Post-retort bond strength (g/15 mm) | 1040 | 1250 | 1090 |

From the above results it was confirmed that the packaging laminate of the present invention was satisfactorily resistant to the retort at 140° C.

EXAMPLE 3

The procedure of Example 1 was followed except that a specific polyolefin resin was prepared by reacting maleic anhydride, benzoyl peroxide and aluminum hydroxide together in a xylene solution of the polypropylene, to obtain a packaging laminate. The packaging laminate so obtained was tested in the same manner as in Example 1 and approximately the same results as in Example 1 were obtained. This demonstrates that the order of combining polyolefin maleic anhydride and aluminum hydroxide may be varied.

EXAMPLE 4

The retort and preservation test procedure of Example 1 were followed except that in bonding the specific polyolefin resin to the aluminum side of the aluminum foil/polyester film laminate a heat treatment at 180° C. for one second was substituted for the heat treatment at 180° C. for 5 seconds. The pre and post-test bond strengths were determined, with the results being shown in the following Table 4.

TABLE 4

| | | After retort test | | | Preservation test | |
| --- | --- | --- | --- | --- | --- | --- |
| Contents | Pre-retort bond strength | Water | Salad oil/water (1:1) | 3% aqueous solution of acetic acid | 4% aqueous solution of acetic acid (1 Week) | Seasoning for Chinese food (2 weeks) |
| Bond strength (g/15 mm) | 1180 | 1150 | 1120 | 1060 | 980 | 1040 |

EXAMPLE 5

The retort and preservation test procedures of Example 1 were followed except that in bonding the specific polyolefin resin to the aluminum side of the aluminum foil/polyester film laminate a heat treatment was carried out by contact with a heating roll having a surface temperature of 220° C. for each of 0.3 and 0.5 seconds. The results are shown in the following Table 5.

TABLE 5

| | | Contents | | | | |
| --- | --- | --- | --- | --- | --- | --- |
| | | Retort test | | | Preservation test | |
| Heat treatment (Contact time) | Pre-retort bond strength | Water | Salad oil/water (1:1) | 3% aqueous solution of acetic acid | 4% aqueous solution of acetic acid (One week) | Seasoning for Chinese food (Two weeks) |
| 0.3 sec | 1350 | 1180 | 1250 | 1080 | 950 | 1030 |
| 0.5 sec | 1260 | 1210 | 1190 | 1130 | 1080 | 1180 |

EXAMPLE 6

The procedure of Example 1 was followed except that high density-polyethylene (M.I. 6.0) in one instance and a propylene-ethylene copolymer (propylene/ethylene ratio =95/5) in a second instance were substituted for the polypropylene to obtain two different specific polyolefin resins. Using each of the thus obtained specific polyolefin resins, the same retort and preservation test procedures as in Example 1 was carried out with the results shown in the following Table 6.

The resulting laminate was prepared by using a high density-polyethylene film instead of polypropylene film.

TABLE 6

| | | | | | After preservation test | |
| --- | --- | --- | --- | --- | --- | --- |
| | Pre-retort bond strength | After retort test | | 3% aqueous solution of acetic acid | 4% aqueous solution of acetic acid (1 week) | Seasoning for Chinese food (2 weeks) |
| Contents | | Water | Salad oil/water (1:1) | | | |
| Specific polyolefin resin derived from high-density polyethylene (M.I. 60) | 1250 | 1180 | 1110 | 1040 | 990 | 1100 |
| Specific polyolefin resin derived from ethylene-propylene copolymer (propylene/ethylene ratio = 95/5) | 1280 | 1230 | 1200 | 1120 | 960 | 1010 |

EXAMPLE 7

A polypropylene-maleic anhydride copolymer (not reacted with aluminum hydroxide) was coated onto the aluminum side of an aluminum foil/polyester laminate to a 10μ thickness by the use of an extruder in the same manner as in Example 1 to obtain a laminate. Samples of the laminate so obtained were heat treated at 180° C. for one second, at 180° C. for 5 seconds and at 220° C. for 20 seconds, respectively, after which the heat treated samples were each laminated on the copolymer side with a 70μ thick polypropylene film and the whole was then passed at a velocity of 40 m/min. On a heating roll at 180° C. to obtain a product laminate. The bond strength for the polypropylene/aluminum foil of each of the product laminates so obtained was less than 100 g/15 mm. This is contrasted to the bond strength of at least 1230 g./15 mm obtained in Example 1 where aluminum hydroxide was used in forming the specific polyolefin resin therein.

EXAMPLES 8-12

EXAMPLE 8

In accordance with the procedure of Example 7, a polyolefin (polypropylene)-$\alpha,\beta$-ethylenically unsaturated carboxylic acid (acrylic acid) copolymer was prepared (2 parts of acrylic acid per 100 parts polypropylene) and coated onto the aluminum side of an aluminum foil/polyester laminate to a thickness of 10$\mu$ and then heat treated at 220° C. for 20 seconds. This copolymer was used to prepare, according to the procedure of Example 7, the laminates consisting of the following structure: polyester film (outer layer)/aluminum foil/polyolefin-$\alpha,\beta$-ethylenically unsaturated carboxylic acid copolymer/polypropylene film (inner layer).

The pre-retort bond strength of the laminate so prepared was found to be 310 g./15 mm.

Containers were formed of said laminate and filled with water, salad oil/water (1:1) and a 3% aqueous solution of acetic acid respectively and retorted at 120° C. for 30 minutes. The post-retort bond strengths were determined and found to be:

|  | Post Retort Bond Strength |
|---|---|
| Water | 300 |
| Salad oil/water (1:1) | 160 |
| 3% aqueous solution of acetic acid | 290 |

EXAMPLE 9

The procedure of Example 8 was followed except that 0.8 part of acrylic acid per 100 parts of polypropylene was used in the preparation of the copolymer. The results of the pre-retort and post-retort bond strengths were as follows:

|  | Bond Strengths | |
|---|---|---|
|  | Pre-retort | Post-retort |
| Water | 160 | 155 |
| Salad oil/water (1:1) |  | 120 |
| 3% aqueous solution of acetic acid |  | 310 |

EXAMPLE 10

The procedure of Example 8 was followed, except that 6 parts of methacrylic acid per 100 parts of polypropylene was used in the preparation of the copolymer. The results of the pre-retort and post-retort bond strengths were as follows:

|  | Bond Strengths | |
|---|---|---|
|  | Pre-Retort | Post-Retort |
| Water | 240 | 215 |
| Salad oil/water (1:1) |  | 140 |
| 3% aqueous solution of acetic acid |  | 320 |

EXAMPLE 11

The procedure of Example 8 was followed, except that the polyolefin used was polybutene and the $\alpha,\beta$-ethylenically unsaturated acid was methacrylic acid, 6 parts of methacrylic acid per 100 parts of polybutene, in the preparation of the copolymer. The results of the preretort and post-retort bond strengths were as follows:

|  | Bond Strengths | |
|---|---|---|
|  | Pre-Retort | Post-Retort |
| Water | 510 | 490 |
| Salad oil/water (1:1) |  | 480 |
| 3% aqueous solution of acetic acid |  | 430 |

EXAMPLE 12

The procedure of Example 8 was followed, except that the polyolefin used was high-density polyethylene and the $\alpha,\beta$-ethylenically unsaturated acid was maleic anhydride, 10 parts of maleic anhydride per 100 parts of high density-polyethylene, in the preparation of the copolymer, and the resulting laminate had the following structure:

polyester film (outer layer)/aluminum foil/high density-polyethylene-maleic anhydride copolymer/high density-polyethylene film.

The results of the pre-retort and post-retort bond strengths were as follows:

|  | Bond Strengths | |
|---|---|---|
|  | Pre-Retort | Post-Retort |
| Water | 200 | 180 |
| Salad oil/water (1:1) |  | 150 |
| 3% aqueous solution of acetic acid |  | 240 |

The laminates formed by coating the copolymers of Examples 8 through 12 formed from a polyolefin and $\alpha,\beta$-ethylenically unsaturated acid onto the aluminum side of an aluminum foil/polyester laminate were each formed using heat treatments of 180° C. for one second and for 5 seconds respectively. The pre-retort bond strengths in each instance were less than 100 g./15 mm.

The results of Examples 8 through 12 are summarized in Table 7.

TABLE 7

| Example | 8 | 9 | 10 | 11 | 12 |
|---|---|---|---|---|---|
| Base resin (Parts of $\alpha,\beta$-ethylenically unsaturated carboxylic acid added) | Polypropylene-acrylic acid | Polypropylene-acrylic acid | Polypropylene-methacrylic acid | Polybutene-acrylic acid | High-density polyethylene-maleic anhydride |
| (Parts) | (2) | (0.8) | (6) | (1) | (10) |
| Metal compound added | — | — | — | — | — |

TABLE 7-continued

| Example | | 8 | 9 | 10 | 11 | 12 |
|---|---|---|---|---|---|---|
| (Parts) | | (0) | (0) | (0) | (0) | (0) |
| Pre-retort bond strength | | 310 | 160 | 240 | 510 | 200 |
| Post-retort bond strength | Water | 300 | 155 | 215 | 490 | 180 |
| | Salad oil/water (1:1) | 160 | 120 | 140 | 480 | 150 |
| | 3% aqueous solution of acetic acid | 290 | 310 | 320 | 430 | 240 |

(Bond strength: g/15 mm)

Comparing the results of Examples 1 through 6 with those of Examples 7 through 12, it is seen that the pre-retort and post-retort bond strengths of laminates formed from a copolymer in which aluminum hydroxide was employed in the reaction with a polyolefin and an α,β-ethylenically unsaturated acid to form a specific polyolefin resin (Examples 1 through 6) are very much greater than in the instances (Examples 7 through 12) where aluminum hydroxide was not employed.

EXAMPLES 13-26

The procedure of Example 1 was followed, except that modified specific polyolefin resins were formed by substituting for aluminum hydroxide the compounds zinc hydroxide, magnesium hydroxide, calcium hydroxide, potassium hydroxide, magnesium acetate, calcium acetate, magnesium oxide, iron sulphate, magnesium hydroxide, calcium oxide, zinc hydroxide and zinc oxide respectively and by varying the number of parts of maleic anhydride, acrylic acid and methacrylic acid per 100 parts of polypropylene and high density-polyethylene, as set forth in Table 8. Such modified specific polyolefin resins were used to form the laminates of Example 1, except that a high density-polyethylene film was substituted for the polypropylene film when the polyolefin of the modified specific polyolefin resin was high density-polyethylene.

The laminates so obained were tested for preretort and post-retort bond strengths, and the results are set forth as indicated in Table 8.

TABLE 8

| Example | | 13 | 14 | 15 | 16 | 17 | 18 | 19 |
|---|---|---|---|---|---|---|---|---|
| (Parts of α,β-ethylenically unsaturated carboxylic acid added) | | Polypropylene maleic anhydride | Polypropylene maleic anhydride | Polypropylene maleic anhydride | Polypropylene maleic anhydride | Polypropylene maleic anhydride | Polypropylene maleic anhydride | Polypropylene maleic anhydride |
| (Parts) | | (3) | (5) | (10) | (20) | (1) | (0.3) | (10) |
| Metal compound added | | Zinc hydroxide | Magnesium hydroxide | Calcium hydroxide | Potassium hydroxide | Magnesium acetate | Calcium acetate | Magnesium oxide |
| (Parts) | | (2) | (4.5) | (2) | (6.5) | (0.15) | (0.25) | (1.5) |
| Pre-retort bond strength | | 1100 | 740 | 920 | 780 | 580 | 830 | 670 |
| Post-retort bond strength (g/15 mm) | Water | 980 | 705 | 830 | 650 | 560 | 720 | 635 |
| | Salad oil/water (1:1) | 890 | 680 | 810 | 500 | 510 | 690 | 610 |
| | 3% aqueous solution of acetic acid | 500 | 510 | 520 | 420 | 485 | 630 | 460 |
| Example | | 20 | 21 | 22 | 23 | 24 | 25 | 26 |
| Parts of α,β-ethylenically unsaturated carboxylic acid added) | | Polypropylene maleic anhydride | Polypropylene acrylic acid | Polypropylene acrylic acid | Polypropylene methacrylic acid | Polybutene maleic anhydride | High-density polyethylene maleic anhydride | High-density polyethylene acrylic acid |
| (Parts) | | (5) | (20) | (1) | (5) | (10) | (10) | (1) |
| Metal compound added | | Iron sulphate | Magnesium hydroxide | Calcium acetate | Calcium oxide | Zinc hydroxide | Magnesium hydroxide | Zinc oxide |
| (Parts) | | (1) | (6.5) | (0.3) | (0.5) | (2) | (1) | (1) |
| Pre-retort bond strength | | 780 | 770 | 845 | 765 | 1160 | 745 | 880 |
| Post-retort bond strength (g/ | Water | 760 | 830 | 650 | 595 | 800 | 825 | 635 |
| | Salad oil/water (1:1) | 735 | 795 | 625 | 565 | 720 | 740 | 585 |
| | 3% aque- | | | | | | | |

TABLE 8-continued

| (15 mm) | ous solution of acetic acid | 480 | 490 | 535 | 530 | 580 | 460 | 400 |
|---|---|---|---|---|---|---|---|---|

In addition, the packaging laminates obtained in Examples 13–26 were subjected to the same preservation test as in Example 1 with the result that both the containers containing a 4% aqueous solution of acetic acid and those containing said seasoning for Chinese food exhibited delamination.

The containers or pouches made respectively of laminates including magnesium- and calcium-containing polyolefin resin showed blistering when holding therein a 3% aqueous solution of acetic acid. The containers made in the Examples 13, 17 and 18 exhibited very low bond strength as shown in Table 9 after having been subjected to retort treatment and then a preservation test at 40° C. for 30 days (the preservation test being a very mild one compared with that in Example 1). Thus, the containers of Examples 13, 17 and 18 failed in the preservation test and, further, as mentioned, they were inferior in postretort bond strength to the containers of Examples 1 through 6.

TABLE 9

| | | Contents | | |
|---|---|---|---|---|
| | Example | Water | Salad oil/water (1:1) | 3% aqueous solution of acetic acid |
| Bond strength (g/15 mm) | 13 | 310 | 210 | 160 |
| | 17 | 340 | 300 | 105 |
| | 18 | 290 | 280 | 120 |

The procedure of each of Examples 16, 18, 21 and 26 was followed except that a polyolefin resin was heat treated at 180° C. for one second in substitution for the heat treatment at 180° C. for 5 seconds, to obtain containers which were tested for bond strength, with the results being shown in the following Table 10. In addition, the containers respectively containing a 4% aqueous solution of acetic acid and said seasoning for Chinese food exhibited delamination when they were subjected to the same preservation test as in Example 1.

TABLE 10

| | | Contents | | |
|---|---|---|---|---|
| | | | After retort test | |
| Example | Pre-retort bond strength | Water | Salad oil/ Water (1:1) | 3% aqueous solution of acetic acid |
| 16 | 620 | 590 | 480 | 460 |
| 18 | 670 | 480 | 480 | 430 |
| 21 | 620 | 530 | 440 | 380 |
| 26 | 700 | 610 | 450 | 430 |

It is noted that the use of a heat treatment at 180° C. for only one second (see Example 4) instead of a heat treatment at 180° C. for 5 seconds (as in Example 1) provided laminates which exhibited hardly any decrease in bond strengths. However, a heat treatment at 180° C. for only one second in the instances of Examples 16, 18, 21 and 26 provided laminates where there was a considerable decrease in bond strengths when compared to heat treatment at 180° C. for 5 seconds.

EXAMPLES 27–36

Polyolefin resins (containing metal) as indicated in Table 11 were prepared and there were prepared therefrom packaging laminates having the structure: polyester film (outer layer)/aluminum foil/polyolefin resin/polypropylene film (inner layer). The packaging laminates so prepared were subjected to a retort test at 120° C. for 30 minutes. Further, containers made of the laminates were packed respectively with a 4% aqueous solution of acetic acid and said seasoning for Chinese food were subjected to a test for bond strength after a preservation test at 66° C. for one week and two weeks, respectively. The results are shown in the following Table 11.

TABLE 11

| Example | | Example 27 | Example 28 | Example 29 | Example 30 | Example 31 |
|---|---|---|---|---|---|---|
| Base resin (Parts of α,β-ethylenically unsaturated carboxylic acid added) | | PP-MAH | PP-MAH | PP-AA | PP-AA | PP-AA |
| (Parts) | | (0.6) | (0.8) | (2) | (2) | (2) |
| Metal compound added | | Aluminum hydroxide | Aluminum hydroxide | Aluminum hydroxide | Aluminum oxide | Aluminum carbonate |
| (Parts) | | (0.3) | (1.2) | (0.9) | (0.4) | (1.5) |
| Pre-retort bond strength | | 1020 | 1270 | 1250 | 1020 | 1230 |
| Post-retort bond strength | Water | 990 | 1180 | 1080 | 1160 | 1180 |
| | Salad oil/water (1:1) | 1130 | 1260 | 1290 | 1040 | 1100 |
| | 3% aqueous solution of acetic acid | 1120 | 1130 | 1020 | 980 | 1190 |
| Bond strength after preservation test | 4% aqueous solution of acetic acid | 1040 | 1090 | Delamination | Delamination | Delamination |
| | Seasoning for Chinese food | 1070 | 1180 | 250 | 230 | 210 |

TABLE 11-continued

| Example | Example 32 | Example 33 | Example 34 | Example 35 | Example 36 |
|---|---|---|---|---|---|
| Base resin (Parts of $\alpha,\beta$-ethylenically unsaturated carboxylic acid added) (Parts) | PP-AA (2) | PP-MAA (6) | PP-MA (0.7) | PB-AA (1) | P-E copolymer-AA (4.5) |
| Metal compound added (Parts) | Aluminum sulphate (3.0) | Aluminum hydroxide (1.0) | Aluminum oxide (0.05) | Aluminum hydroxide (15) | Aluminum hydroxide (6.5) |
| Pre-retort bond strength | 1210 | 1080 | 1150 | 1160 | 960 |
| Post-retort bond strength — Water | 1010 | 1000 | 1220 | 1280 | 890 |
| Post-retort bond strength — Salad oil/water (1:1) | 1170 | 1180 | 1310 | 1260 | 830 |
| Post-retort bond strength — 3% aqueous solution of acetic acid | 1050 | 1040 | 960 | 1110 | 760 |
| Bond strength after preservation test — 4% aqueous solution of acetic acid | Delamination | Delamination | Delamination | Delamination | Delamination |
| Bond strength after preservation test — Seasoning for Chinese food | 220 | 190 | 150 | 200 | 250 |

Note:
PP, polypropylene;
MAH, maleic anhydride;
AA, acrylic acid;
MAA, methacrylic acid;
MA, maleic acid;
P-E, propylene-ethylene copolymer.

It is noted that in the instances where the "Base resin", i.e., specific polyolefin resin, is composed of polypropylene, maleic anhydride and aluminum hydroxide, (Examples 27 and 28), the bond strengths after the preservation test were excellent (1040 and 1090 respectively) but that there was delamination in the preservation test (Examples 29–36) where maleic anhydride was not the $\alpha,\beta$-ethylenically unsaturated acid.

EXAMPLE 37

The polypropylene-maleic anhydride copolymer (maleic anhydride content 0.6%) obtained in Example 1 was reacted with 6.5 parts of aluminum hydroxide in xylene at 130° C. for one hour to obtain a specific polyolefin resin. The polyolefin resin so obtained was washed, dried, dispersed in xylene (solid matter: 15%) and coated on the same aluminum foil as in Example 1 to form a 5μ thick coating which was then dried at 180° C. for 5 seconds. The specific polyolefin resin-coated aluminum foil was laminated on the resin coating side with a 70μ thick corona discharge-treated polypropylene film and then passed at a velocity of 40 m/min. over a heating roll at 180° C. The packaging laminate so obtained showed a polypropylene film/aluminum foil bond strength of at least 1150 g/15 mm when subjected to a peeling test.

This packaging laminate was used to make containers which were packed respectively with water, salad oil/water (1:1) and a 3% aqueous solution of acetic acid and then subjected to a retort test at 120° C. for 30 minutes. Thereafter, the packaging laminates of the tested containers were measured for bond strength with the results being indicated in the following Table 12.

TABLE 12

| Contents | Water | Salad oil/water (1:1) | 3% aqueous solution of acetic acid |
|---|---|---|---|
| Post-retort bond strength (g/15 mm) | 1190 | 1090 | 1040 |

EXAMPLE 38

The specific polyolefin resin pellets obtained in Example 1 were made into 70μ thick films at 190° C. by the use of an inflation extruder. The film so made was laid on a 15μ thick aluminum foil and heated under pressure on a heating roll at 180° C. for 3 seconds to obtain a specific polyolefin resin/aluminum foil laminate. The laminate so obtained was tested for bond strength and found to have a bond strength of 1160 g/15 mm. The laminate was made into containers which were packed respectively with water, salad oil/water (1:1) and a 3% aqueous solution of acetic acid and then subjected to a retort test at 140° C. for 20 minutes. After the retort test, the tested containers were measured for bond strength with the result that they exhibited 1120 g/15 mm, 1010 g/15 mm and 1050 g/15 mm, respectively. The said containers exhibited satisfactory results when subjected to the same preservation test as in Example 1.

EXAMPLE 39

Figure 5:
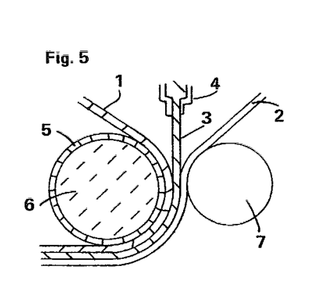
FIG. 5 is a cross-sectional view showing a sandwich lamination obtained by extruding a specific polyolefin resin into the nip or zone of contact between an aluminum foil and a polyolefin film.

The specific polyolefin resin obtained in Example 1 was melt extruded in a 10μ thickness into the nip between a 15μ thick aluminum foil/polyester laminate and a 70μ thick polypropylene film by the use of an extruder and then sandwich laminated by such a method as shown in FIG. 5 thereby to obtain a packaging laminate. The lamination was effected at a lamination speed of 60 m/min. by contracting the to-be-laminated materials with a heating roll having a surface temperature of 220° C. for one second. The packaging laminate thus obtained exhibited satisfactory laminate strength, post-retort bond strength and preservation test results as in Example 1.

EXAMPLE 40

The specific polyolefin resin obtained in Example 1 and polypropylene were co-extruded to obtain a laminate of a 10$\mu$ thick specific polyolefin resin with a 50$\mu$ thick polypropylene. Then, the thus obtained laminate was laid on a 15$\mu$ thick aluminum foil/polyester laminate with the specific polyolefin resin side facing to the aluminum foil side, and the whole was then contacted with a heating roll having a surface temperature of 220° C. for one second thereby to produce a packaging laminate. The laminate so produced exhibited satisfactory bond strength as in Example 1.

EXAMPLE 41

The specific polyolefin resin/polypropylene laminate obtained in Example 40 was laid on a 100$\mu$ thick aluminum sheet with the polyolefin resin side facing to the aluminum sheet, and the whole was contacted with a heating plate having a surface temperature of 250° C. for 3 seconds thereby to obtain a packaging laminate. The packaging laminate so obtained was tested as in Example 1 with the results being obtained in Table 13.

TABLE 13

|  | Pre-retort bond strength | Post-retort bond strength | | | After preservation test | |
| --- | --- | --- | --- | --- | --- | --- |
|  |  | Water | Salad oil/water (1:1) | 3% aqueous solution of acetic acid | 4% aqueous solution of acetic acid | Seasoning for Chinese food |
| Bond strength | 1310 | 1260 | 1180 | 1130 | 1080 | 1160 |

EXAMPLE 42

A propylene acrylic acid copolymer (acrylic acid content: 3 mol%) was incorporated with 0.3 mol of aluminum hydroxide in dispersion in methanol per mol of the acrylic acid, and the whole was mixed together on a kneading roll (190° C.) for 30 minutes. The melted mixture so obtained was dispersed in xylene and coated in a 5$\mu$ thickness on a 30$\mu$ thick aluminum foil. The thus coated aluminum foil was contacted at the aluminum foil side with a heating roll at 190° C. (rotating at 10 r.p.m.). Then, a 70$\mu$ thick polypropylene film was applied to the polyolefin resin side at 180° C. to form a laminate. The bond strength between the aluminum foil and the polypropylene film was 1030 g/15 mm. The laminate so obtained was subjected to a retort test in the same manner as in Example 1 and the results are shown in Table 14.

TABLE 14

| Contents | Water | Salad oil/water (1:1) | 3% aqueous solution of acetic acid |
| --- | --- | --- | --- |
| Post-retort bond strength (g/15 mm) | 960 | 1210 | 990 |

The same preservation test as in Example 1 was made on the laminates with the result that they were found unsatisfactory for practical use as shown in Table 15.

TABLE 15

| Contents | 4% aqueous solution of acetic acid | Seasoning for Chinese food |
| --- | --- | --- |
| Bond Strengths | Delamination | 250 |

EXAMPLE 43

One hundred (100) parts of polypropylene, 0.4 parts of maleic anhydride and 0.1 parts of benzoyl peroxide were melt kneaded on a heating roll at 185° C. for 10 minutes. After the end of melt kneading, the materials were extracted thoroughly with acetone to remove the unreacted maleic anhydride and low molecular weight maleic anhydride homopolymers to obtain a polypropylenemaleic anhydride copolymer. The copolymer so obtained was incorporated with aluminum hydroxide in an amount of 1.5 parts per 100 parts of the polypropylene to form a mixture which was blended on a Henschel mixer.

The blend so obtained was melt blended and extruded by an extruder at 180° C. The specific polyolefin resin pellets thus obtained were extrusion coated as an adhesive in a 10$\mu$ thickness on a 15$\mu$ thick aluminum foil (a laminate of aluminum foil/polyester) by the use of an extruder (dies temperature: 235° C.) to form a resin-/aluminum laminate. Immediately after the coating, the thus formed laminate was contacted on the reverse (polyester) side with a heating roll (surface temperature: 180° C.) for one second as indicated in FIG. 1, to heat (heat treatment corresponding to 60 m/min.) the laminate thereby enabling the surface-coated specific polyolefin resin to adhere to the aluminum foil securely.

Further, a 70$\mu$ thick polypropylene film was laid on the specific polyolefin resin coating, and the whole was passed on a heating roll (surface temperature: 180° C.) at a travelling velocity of 60 m/min. In the thus obtained packing laminate, the bond strength of the polypropylene film/aluminum foil was tested and found to be as high as 1020 g/15 mm. The packaging laminate was made into containers which were packed respectively with water, salad oil/water (1:1) and a 3% aqueous solution of acetic acid respectively, and then subjected to a retort test at 120° C. for 30 minutes. After the retort test, the packaging laminates were tested for bond strength with the results being shown in the following Table 16.

TABLE 16

| Contents | Water | Salad oil/water (1:1) | 3% aqueous solution of acetic acid |
| --- | --- | --- | --- |
| Post-retort bond strength (g/15 mm) | 1040 | 1110 | 990 |

Furthermore, the packaging laminates were subjected to the same preservation test as in Example 1 with the results being shown in Table 17.

TABLE 17

| Contents | 4% aqueous solution of acetic acid | Seasoning for Chinese food produced by Company A |
|---|---|---|
| Bond Strength (g/15 mm) | 960 | 1130 |

EXAMPLE 44

The packaging laminate obtained in Example 43 was made into containers which were packed respectively with the following materials as shown in Table 18 and then subjected to a retort test at 135° C. for 20 minutes. The results are as shown in Table 18.

TABLE 18

| Contents | Water | Salad oil/water | 3% aqueous solution of acetic acid |
|---|---|---|---|
| Post-retort bond strength (g/15 mm) | 1010 | 980 | 960 |

From the above results it was confirmed that the specific polyolefin resin according to the present invention was satisfactorily resistant to the retort test at 135° C.

EXAMPLE 45

The resin extrusion coated laminates (resin/aluminum laminates) obtained in Example 43 were respectively heat treated as shown in Table 19 and then each laminate with a 70μ thick polypropylene film to obtain packaging laminates. The packaging laminates were each made into containers which were packed respectively with the materials shown in Table 19, subjected to a retort test at 120° C. for 30 minutes and then tested for bond strength. The results are shown in Table 19.

TABLE 19

| Heat treating conditions | | Post-retort bond strength (g/15 mm) | |
|---|---|---|---|
| | | Salad oil/water (1:1) | 3% aqueous solution of acetic acid |
| 160 (°C.) | 20 (sec) | 1190 | 1180 |
| 180°, | 5 | 1110 | 980 |
| 200°, | 3 | 1140 | 1110 |
| 220°, | 3 | 1220 | 1170 |

As is seen from the above results, the packaging laminate containing the resin/aluminum laminate previously heat treated at 200° C. for 3 seconds exhibited high bond strength.

EXAMPLES 46–53

In the same manner as in Example 43, specific polyolefin resins were prepared under the various conditions shown in Table 20. The packaging laminates obtained were a laminate of polyester film (outer layer)-/aluminum foil/specific polyolefin resin/polypropylene film (inner layer) and subjected to a retort test at 120° C. for 30 minutes with the results being shown in Table 20. In the above packaging laminates, a polyolefin film was used as the inner layer in substitution for the polypropylene film when the polyolefin of the specific polyolefin resins was polyethylene.

TABLE 20

| Example | | Example 46 | Example 47 | Example 48 | Example 49 |
|---|---|---|---|---|---|
| Polyolefin-α,β-ethylenically unsaturated carboxylic acid | | PP-MAH | PB-MAH | PP-AA | PP-MA |
| (Parts) | | (0.3) | (0.4) | (6.0) | (0.5) |
| Aluminum compound | | Aluminum hydroxide | Aluminum hydroxide | Aluminum hydroxide | Aluminum oxide |
| (Parts) | | (0.2) | (0.4) | (6.2) | (0.6) |
| Heat treating conditions for laminate of specific polyolefin resin/aluminum foil | | Contact with heating roll 180° C., 1 sec | Infra-red light radiation 10 KW, 1 sec | Heated in oven 180° C., 5 sec | Infra-red light radiation 5 KW, 2 sec |
| Pre-retort bond strength | | 980 | 990 | 1120 | 960 |
| Post-retort bond strength | Water | 1060 | 1110 | 1040 | 990 |
| | Salad oil/water (1:1) | 1020 | 1140 | 1010 | 1020 |
| | 3% aqueous solution of acetic acid | 940 | 1020 | 980 | 980 |
| Bond strength after preservation test | 4% aqueous solution of acetic acid | 890 | 920 | Delamination | Delamination |
| | Seasoning for Chinese food produced by Co. A | 980 | 1030 | 250 | 240 |
| Example | | Example 50 | Example 51 | Example 52 | Example 53 |
| Polyolefin-α,β-ethylenically unsaturated carboxylic acid | | PE-MAH | PP-MAH | Propylene-ethylene copolymer-MAH | PE-MAH |
| (Parts) | | (0.3) | (0.5) | (0.1) | (0.5) |
| Aluminum compound | | Aluminum acetate | Aluminum sulphate | Aluminum isopropoxide | Aluminum sulphate |
| (Parts) | | (1.0) | (5.0) | (3.0) | (0.5) |
| Heat treating conditions for laminate of specific polyolefin resin/aluminum foil | | Heated in oven 180° C., 3 sec | Contact with heating roll 200° C., 0.5 sec | Contact with heating roll 180° C., 1 sec | Heated in oven 200° C., 2 sec |
| Pre-retort bond strength | | 970 | 930 | 810 | Polyethylene film broken |
| Post-retort bond strength | Water | 960 | 960 | 790 | |
| | Salad oil/water (1:1) | 940 | 980 | 650 | |
| | 3% aqueous solution | 860 | 890 | 580 | |

TABLE 20-continued

| | | | | |
|---|---|---|---|---|
| Bond strength after preservation test | 4% aqueous solution of acetic acid | Delamination | Delamination | Delamination |
| | Seasoning for Chinese food produced by Co. A | 270 | 190 | 160 |

Note:
PP, polypropylene;
PB, polybutene;
PE, high-density polyethylene;
MA, maleic acid;
MAH, maleic anhydride;
AA, acrylic acid.

EXAMPLE 54

The polypropylene-maleic anhydride copolymer as obtained in Example 43 was incorporated with 1.5 parts of aluminum hydroxide and xylene (solid matter: 15 wt.%) and heated to 130° C. for 60 minutes, after which the resulting mixture was coated in a thickness of about 5μ on a 15μ thick aluminum foil (aluminum/polyester laminate). The thus-coated aluminum foil was heat treated at 180° C. for 5 seconds, a 70μ thick polypropylene film was laid thereon and the whole was passed at a velocity of 60 m/min on a heating roll at 180° C. to produce a packaging laminate. The thus produced packaging laminate was confirmed to have high bond strength of 1160 g/15 mm between the polypropylene film and aluminum foil. Further, the packaging laminate was made into containers which were packed respectively with salad oil/water (1:1) and a 3% aqueous solution of acetic acid and then subjected to a retort test at 120° C. for 30 minutes with the result they exhibited bond strengths of 1140 and 1020 g/15 mm. They also exhibited satisfactory results in the same preservation test as mentioned before.

EXAMPLE 55

One hundred (100) parts of polypropylene (M.I., 10), 16 parts of maleic anhydride, 10 parts of 1,2-polybutadiene (number average molecular weight: 150,000) and 375 parts of xylene were charged into a 1-liter three-necked flask fitted with a nitrogen gas inlet, thermometer and stirrer to form a mixture which was heated to 130° C. with stirring in a nitrogen gas atmosphere to obtain a reaction mixture. To the thus-obtained reaction mixture was dropwise added a solution of 1.5 parts of benzoyl peroxide in 40 parts of xylene over a time period of 90 minutes. Thereafter, the reaction mixture continued to be heated to 130° C. with stirring for 30 minutes and was then cooled to room temperature to obtain a suspension. The suspension so obtained was filtered to remove therefrom the xylene and repeatedly washed with acetone until the unreacted maleic anhydride and low molecular weight, maleic anhydride homopolymers were hardly detected in the acetone washings to obtain a powdery resin. The powdery resin was air dried, again dissolved in xylene, incorporated with 1.0 part of aluminum hydroxide and heated to 130° C. with stirring for 30 minutes in a nitrogen atmosphere to obtain a specific polyolefin resin. After the end of the heating, the resin so obtained was applied in an about 5μ thickness to a 15μ aluminum foil (aluminum/polyester laminate) while it was hot. The resin-applied aluminum foil was heated to 180° C. for 5 seconds, a 70μ thick polypropylene film was laid thereon, and the whole was passed at a velocity of 20 m/min (two second's contact) on a heating roll at 180° C. to obtain a packaging laminate. The polypropylene film/aluminum foil of the packaging laminate exhibited a high bond strength of 1360 g/15 mm when a 90° peeling test was effected at a pull velocity of 100 mm/min. The packaging laminate was made into containers which were packed respectively with the materials indicated in Table 21 and then subjected respectively to a retort test at 120° C. for 30 minutes and a preservation test at 66° C. The measurement of bond strength was effected as previously mentioned. The results are as shown in Table 21.

TABLE 21

| | Retort test | | | Preservation test | |
|---|---|---|---|---|---|
| Contents | Water | Salad oil/water (1:1) | 3% aqueous solution of acetic acid | 4% aqueous solution of acetic acid (one week) | Seasoning for Chinese food produced by Company A |
| Bond strength (g/15 mm) | 1280 | 1210 | 1120 | 1010 | 1190 |

Furthermore, some of the packaging laminates using therein the polyolefin resin as an adhesive in the Examples were tested for their hygienic properties with the results being shown in the following Table 22. Two measurements were effected for each of the tests as shown in Table 22.

TABLE 22

| Solvent for elution of packaging laminate | Conditions for elution | Example 43 | Example 46 | Example 49 | Urethane type adhesive |
|---|---|---|---|---|---|
| n-heptane | 65° C. | 18.8 (ppm) | 18.1 (ppm) | 18.0 (ppm) | 18.2 (ppm) |
| | 2 hrs | 18.2 | 17.9 | 18.5 | 17.0 |
| Water | 120° C. | 3.1 | 2.6 | 2.3 | 8.3 |
| | 2 hrs | 2.9 | 2.8 | 2.5 | 7.8 |
| 50% ethanol aqueous solution | 72° C. | 0.5 | 1.1 | 0.9 | 3.1 |
| | 2 hrs | 0.3 | 0.8 | 0.7 | 3.2 |
| 3% acetic acid aqueous solution | Boil | 2.1 | 2.4 | 3.2 | 8.4 |
| | 2 hrs | 1.8 | 2.1 | 2.9 | 7.2 |

TABLE 22-continued

| Solvent for elution of packaging laminate | Conditions for elution | Example 43 | Example 46 | Example 49 | Urethane type adhesive |
|---|---|---|---|---|---|
| Amount of potassium permanganate consumed | 120° C. 2 hrs | 1.7 2.1 | 2.3 1.9 | 1.6 1.5 | 27.4 28.6 |

As is seen from Table 22, the specific polyolefin resins according to the present invention are excellent in hygienic properties defined by the amount of potassium permanganate consumed when compared with the urethane type adhesive and are also suitable for uses to which hygienic considerations should be given.

What is claimed is:

1. A process for preparing a retort-proof coated aluminum substrate for packaging foodstuffs, which process comprises coating an aluminum substrate with a specific polyolefin resin prepared by incorporating aluminum hydroxide with copolymerized (A) and (B), where (A) is at least one member selected from the polyolefin resin group consisting of highdensity polyethylene, polypropylene, ethylene-propylene copolymers and polybutene, and (B) is maleic anhydride, and by rendering the so-modified polyolefin resin substantially free from unreacted maleic anhydride and low molecular weight maleic anhydride homopolymers, and thereafter forming a suitable retort packaging container therefrom.

2. A process for preparing a retort-proof laminate for packaging foodstuffs which comprises laminating an aluminum substrate to at least one polyolefin film selected from the group consisting of high density-polyethylene, polypropylene, ethylene-propylene copolymers and polybutene films using as an adhesive a specific polyolefin resin prepared by incorporating aluminum hydroxide with copolymerized (A) and (B), where (A) is at least one member selected from the polyolefin resin group consisting of high-density polyethylene, polypropylene, ethylene-propylene copolymers and polybutene, and (B) is maleic anhydride, and by rendering the so-modified polyolefin resin substantially free from unreacted maleic anhydride and low molecular weight maleic anhydride homopolymers.

3. A process according to claim 2, wherein the specific polyolefin resin is prepared by combining together 100 parts by weight of the compound (A), 0.01-30 parts by weight of the compound (B) and 0.05-10 parts by weight of the aluminum hydroxide.

4. A process according to claim 2, wherein the compound (A) is graft copolymerized with the compound (B) to form a graft copolymer, the thus formed copolymer is washed substantially free from unreacted maleic anhydride and low molecular weight maleic anhydride homopolymer and the copolymer so washed is incorporated under heat with the aluminum hydroxide.

5. A process according to claim 2, 1 or 3, wherein the specific polyolefin resin is coated on the aluminum substrate, the two materials are contacted with a heating roll or plate having a surface temperature of 150°-250° C. to melt bond them together thereby producing a resin-coated aluminum foil or sheet, and the thus produced resin-coated aluminum foil or sheet is then laminated on the resin side with at least one member selected from the group consisting of high density-polyethylene, polypropylene, ethylene-propylene copolymer and polybutene films.

6. A process according to claim 2, 1 or 3, wherein the specific polyolefin resin is extruded into the nip or zone of contact of the aluminum substrate and at least one polyolefin film selected from the group consisting of high density-polyethylene, polypropylene, ethylene-propylene copolymer and polybutene films to obtain a composite, and the thus-obtained composite is contacted with a heating roll or plate having a surface temperature of 150°-250° C. thereby to obtain the retort-proof laminate.

7. A process for preparing a laminated retort container for packaging foodstuffs which container withstands without delamination food retort conditions up to a temperature of about 140° C. and foods having a hgih acidity, oil, flavoring agents or spices content, said process comprising laminating an aluminum substrate to at least one polyolefin film selected from the group consisting of high-density polyethylene, polypropylene, ethylene-polypropylene copolymers and polybutene films using as an adhesive a specific polyolefin resin in melted state prepared by incorporating aluminum hydroxide with copolymerized (A) and (B), where (A) is at least one member selected from the polyolefin resin group consisting of high-density polyethylene, polypropylene, ethylene-propylene copolymers and polybutene, and (B) is maleic anhydride, and by rendering the so-modified polyolefin resin substantially free from unreacted maleic anhydride and low molecular weight maleic anhydride homopolymers.

* * * * *

UNITED STATES PATENT AND TRADEMARK OFFICE
CERTIFICATE OF CORRECTION

PATENT NO. : 4,308,084
DATED : Dec. 29, 1981
INVENTOR(S) : Akira Ohtusuki, et al It is certified that error appears in the above–identified patent and that said Letters Patent are hereby corrected as shown below:

Title page:

[75] Inventors: Akira Ohtsuki, Higashikurume; Taro Oyama, Houya; Atsuhiro Yamamoto, Kawagoe; Ryosuke Suganuma, Kawaguchi, all of Japan

[73] Assignee: Toyo Ink Manufacturing Co., Ltd., Tokyo, Japan

Signed and Sealed this

Third Day of June 1986

[SEAL]

Attest:

DONALD J. QUIGG

Attesting Officer

Commissioner of Patents and Trademarks